(No Model.)
E. E. B. SHLEPPY.
COMBINATION BEEF MANGLER.
No. 490,367. Patented Jan. 24, 1893.
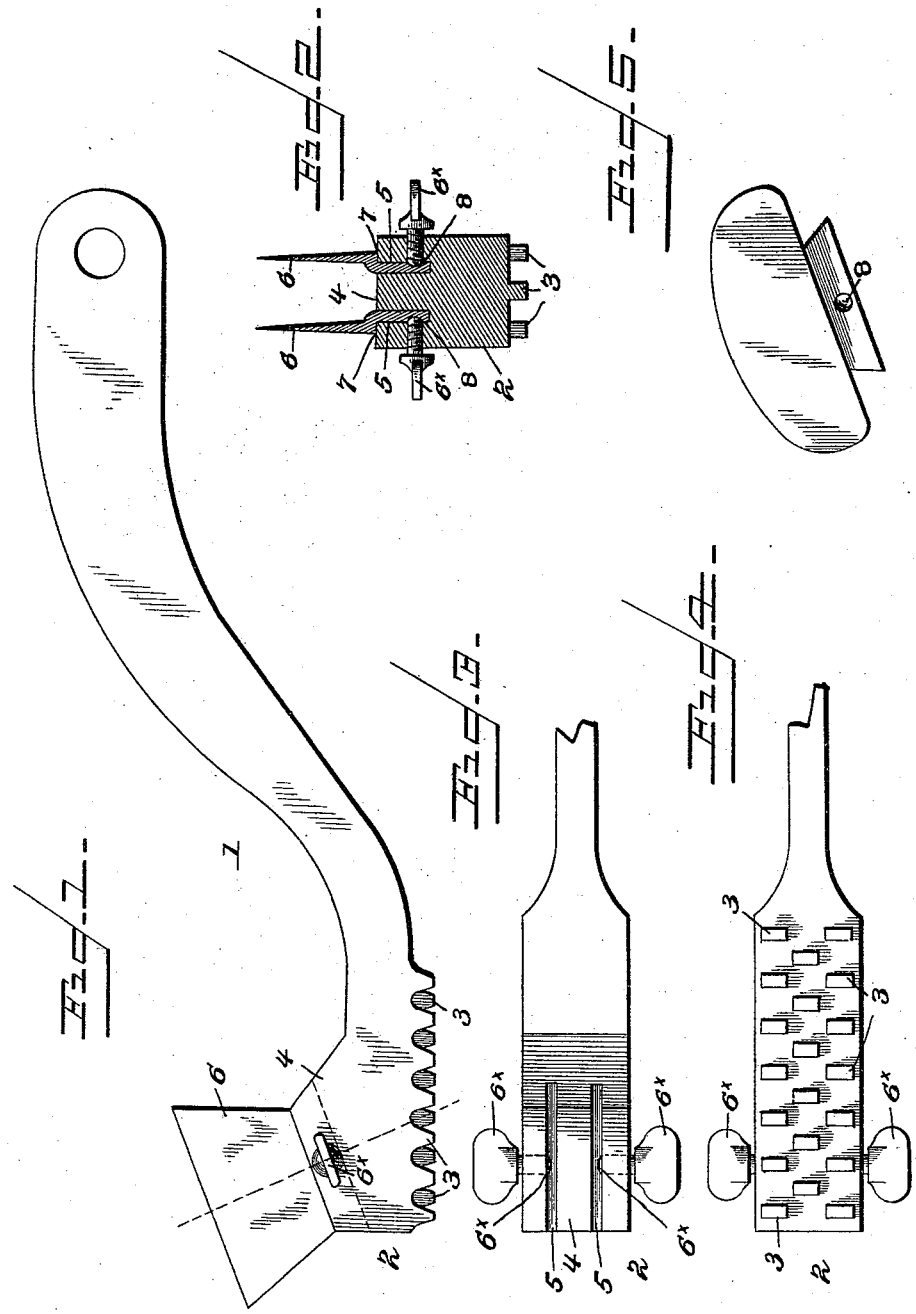
Witnesses
E. K. Stewart
N. F. Riley
Inventor
E. E. B. Shleppy,
By her Attorneys,
C. A. Snow & Co.

UNITED STATES PATENT OFFICE.

ETTIE E. B. SHLEPPY, OF CRAWFORDSVILLE, INDIANA.

COMBINATION BEEF-MANGLER.

SPECIFICATION forming part of Letters Patent No. 490,367, dated January 24, 1893.

Application filed October 16, 1890. Serial No. 368,371. (No model.)

*To all whom it may concern:*

Be it known that I, ETTIE E. B. SHLEPPY, a citizen of the United States, residing at Crawfordsville, in the county of Montgomery and State of Indiana, have invented a new and useful Combination Beef-Mangler, of which the following is a specification.

The invention relates to improvements in meat tenderers.

The object of the present invention is to produce a simple and inexpensive meat tenderer which will not clog and which will be adapted for chopping and trimming meat and for severing and disjointing bones.

The invention consists in the construction and novel combination and arrangement of parts hereinafter fully described, illustrated in the accompanying drawings, and pointed out in the appended claim.

In the drawings: Figure 1 is a side elevation of a meat tenderer embodying the invention. Fig. 2 is a transverse sectional view. Fig. 3 is a plan view, the blades being removed. Fig. 4 is a reverse plan view of the head. Fig. 5 is a detail view of another form of blade.

Like numerals of reference indicate corresponding parts in the several figures of the drawings.

1 designates a shank constructed of metal and curving upward and rearward, and terminating at its rear end in a handle, and provided at its front end with a head 2. The head 2 has a horizontal lower face and is provided thereon with teeth 3, which are arranged at regular intervals in three rows, the teeth of the middle row being arranged opposite the intervals of the teeth of the outer rows to render the tendering or mangling more complete. The upper face 4 of the head is inclined and is provided with parallel longitudinal grooves 5, in which are located shanks of knives 6; and the latter are inclined and are secured in the grooves by clamping-screws $6^{\times}$, which are arranged in threaded openings of the head. The blades 6 are removable and are bayonet-shaped in vertical section to provide a shoulder at the junction of the blade and its shank 7 to fit against the upper face of the head to support the blade. The outer face of the shank of each blade is provided with a concavity or depression 8 to receive the rounded inner ends of the screws. By making the blades removable they can either be employed for chopping or one or the other of the blades may be removed according as the device is to be used by a right-handed or left-handed person for trimming meat or severing or disjointing bones.

The particular shape of the shank and the head and their relative arrangement enable the device to be turned to bring either part in use without altering the position of the hand.

In Fig. 5 of the accompanying drawings another form of blade is shown.

What I claim is:

A meat tenderer, comprising a shank, a head having a horizontal lower face with teeth and having its upper face inclined and provided with grooves, the blades arranged in the grooves and being bayonet-shaped in cross-section and having their shoulders resting upon the head, and clamping-screws securing the blades in grooves, substantially as described.

ETTIE E. B. SHLEPPY.

Witnesses:
C. W. SHLEPPY,
W. F. SHARPE.